United States Patent Office 2,764,498
Patented Sept. 25, 1956

2,764,498

PROCESS OF PLASTICIZING THERMOPLASTIC CELLULOSE ESTERS AND ETHERS WITH AN ORGANIC PLASTICIZER DISPERSED IN AQUEOUS MEDIUM WITH A CATIONIC SURFACE ACTIVE AGENT

Claude Diamond, Leamington Spa, England

No Drawing. Application March 22, 1950,
Serial No. 151,321

Claims priority, application Great Britain March 31, 1949

16 Claims. (Cl. 106—198)

This invention relates to the production of plasticised thermoplastic cellulose derivatives.

It is common practice to incorporate plasticisers with thermoplastic cellulose derivatives in fibrous or other form to increase their plastic flow properties, or to lower the temperature at which they become plastic or melt, or to increase the range between the softening or melting point of the cellulose derivative and the decomposition point thereof for the purpose of producing thermoplastic fibres or moulding powders.

Previously it has usually been necessary to incorporate plasticisers by including them in the spinning solution, or by treatment of the cellulose derivative with a solution of the plasticiser in an organic solvent if the thermoplastic cellulose derivative was in fibrous form, or by a process involving mechanical working if the thermoplastic cellulose derivative was in the form of powder. It has also been proposed to treat cellulose acetate in fibrous form with an aqueous dispersion of a plasticiser using a dispersing agent such as Turkey red oil but such proposal involved special precautions to control the quantity of plasticiser absorbed by the fibre.

In accordance with the invention, a plasticised thermoplastic cellulose derivative is produced by treatment of the solid cellulose derivative with an aqueous dispersion of a plasticiser in the presence of a cationic surface active agent. By the use of such a process I find that there is substantially complete absorption of the plasticiser by the cellulose derivative over a wide range of concentrations of the dispersion and over a wide range of ratios of liquor to cellulose derivative. Furthermore when treating the cellulose derivative in admixture with other materials, the absorption of the plasticiser by the cellulose derivative is highly selective.

The cellulose derivative may be treated in the form of fibre or filaments (including monofils) which have been produced either by dry spinning, melt spinning, or extrusion, or by precipitation or coagulation. The fibres or filaments undergoing treatment may be loose or spun into yarns or in the form of webs, tissues, felts or textile fabrics composed of such yarns. Alternatively the cellulose derivative may be treated in the form of a yarn, web, tissue, felt or fabric having a thermoplastic cellulose derivative component together with one or more components of non-thermoplastic character such as cellulose or of thermoplastic character but not being a cellulose derivative.

In the treatment of such a fabric having mixed components the selectivity of the absorption is an important advantage because the product resulting from the treatment is a web or fabric or the like having one component which is a thermoplastic cellulose derivative which incorporates a plasticiser with one or more components in which it is not desired to incorporate the plasticiser. Such a mixed web or fabric which has been treated in accordance with the invention may be subsequently subjected to heat and pressure to cause the plasticised component to become tacky and so to bond or unite the non-plasticised fibres or yarns, or for the production of decorative effects for example by hot stamping or embossing.

The invention is however not limited to the treatment of fibrous cellulose derivatives and may also be applied to the treatment of flakes or the like produced by precipitation or coagulation. Preferably the flakes or the like are produced under such precipitation or coagulation conditions, and any subsequent cutting is so adjusted, that the flakes, when dry, pass through a ¼" B. S. S. sieve (a ¼ inch sieve as specified by British Standard Specification No. 410, namely, ¼ inch square apertures, wire diameter 0.092", approximate screening area 53%). It is however desirable to subject such flakes to the plasticising treatment before they have been dried and preferably whilst they are still swollen unless they are of porous character. It is also possible to utilise the process of the invention for treating cellulose derivative in a powdered condition, either produced by precipitation or coagulation or by grinding the flakes referred to above, and the powder may without disadvantage be dry before being subjected to the treatment.

The invention is applicable to the treatment of cellulose esters such as for example cellulose acetate of varying acetyl content up to the triacetate and other similar esters such as cellulose propionate and mixed esters such as cellulose acetobutyrate. The cellulose ethers soluble in organic solvents such as methyl and ethyl cellulose may also be treated in accordance with the invention but such ethers are most useful for the production of moulding powders and are not commonly used as fibres.

The plasticisers used should preferably be solvent plasticisers or mixtures containing a proportion of solvent plasticiser. For cellulose acetate for example there may be employed as plasticisers dimethyl phthalate, a mixture of o- and p-toluene ethyl sulphonamide, triphenyl phosphate, ethyl phthalate or methyl phthalyl ethyl glycollate or mixtures thereof. The amount of plasticiser incorporated will vary, depending on the compatibility of the plasticiser and ester and the degree of plasticity required but in general will be from 30–150% based on the weight of cellulose ester. For cellulose butyrate the plasticisers may be dibutyl sebacate, di-2-ethyl hexyl adipate, and diethyl phthalate. For the cellulose ethers, plasticisers which may be employed are dioctyl phthalate, diamyl phthalate, butyl stearate, methyl ricinoleate, diethoxy ethyl phthalate, methyl phthalyl ethyl glycollate or other known plasticisers for cellulose ethers. It will be appreciated that these essentially non-volatile plasticisers which are of a type which is essentially permanently retained by the cellulose derivative plasticised therewith are merely quoted by way of example since the invention is not concerned with the plasticisers themselves, which are well known, but with the method whereby they are incorporated with thermoplastic cellulose derivatives.

The cationic surface active agents may for example be salts containing the quaternary nitrogen or equivalent atom such as long chain alkyl pyridinium halides and certain phosphonium compounds, or salts based on primary, secondary or tertiary amines, one example of the latter being the product made by acylating an unsymmetrical dialkyl ethylene diamine with a fatty acid chloride the product being used in the form of its hydrochloride. Other cationic surface agents may be used, the characteristic property required being to produce a positively charged aqueous dispersion of the plasticiser. Generally the quantity of cationic surface active agent is small but may vary widely e. g. from 0.25–10.0% based on the weight of the plasticiser present.

The invention is further illustrated by the following examples:

*Example 1*

A 65% aqueous dispersion of dimethyl phthalate is prepared using cetyl pyridinium bromide as dispersing agent. This is diluted to produce a bath containing 2.6 g. of dimethyl phthalate, 0.2 g. of the cationic aqueous active agent and 97.2 cc. of water and into this 6.5 g. of cellulose acetate fibres in the form of cut staple are immersed. The operation is carried out at a temperature of 50° C. and the material is left with some agitation until exhaustion is indicated by the clarification of the solution. The product is then removed and dried. The product of this example is uniformly plasticised and the waste liquor from the bath is found to contain only traces of residual plasticiser.

*Example 2*

A 65% emulsion of plasticiser comprising a mixture of o- and p-toluene ethyl sulphonamide is prepared using as the dispersing agent 1% of the cationic surface active material made by acylating an unsymmetrical dialkyl ethylene diamine, N-diethyl ethylene diamine, with oleic acid chloride and converted into hydrochloride. This product is believed to have the following formula in which R represents the oleyl radical:

R.CONHC$_2$H$_4$N(C$_2$H$_5$)$_2$HCl

A web consisting of cellulose acetate staple fibre and regenerated cellulose staple fibre formed on a cotton card is immersed in a bath prepared from the above such that one litre contains 6 g. of the plasticiser. The treatment is effected in such a way that the bath and fibre ratio are adjusted to provide 30% of plasticiser based on the cellulose acetate content of the web. The web is immersed in a bath at a temperature of 35° C. and exhaustion is quickly effected. The treated web is removed, the residual aqueous liquor squeezed out and the web so produced can be bonded by applying heat and pressure with or without previous drying. The process of this example can be carried out continuously by feeding the bath with a concentrated emulsion and by passing the web continuously through the bath, the rate of feeding of the emulsion being adjusted to the rate of passage of the web.

*Example 3*

A fabric formed by weaving 35% cellulose acetate yarn with 65% of cotton yarn is immersed in the bath containing an aqueous dispersion of methyl phthalyl ethyl glycollate made with lauryl pyridinium chloride, the quantity of the latter being 0.5% based on the weight of plasticiser. The plasticiser concentration is so arranged that there is present 50% of plasticiser based on the weight of the acetate component of the fabric. The treatment of the fabric is effected at or near room temperature and exhaustion of the bath is soon substantially complete. The fabric so produced may be used for the production of a laminated fabric or embossed or similar patterns may be applied to the fabric by heat and pressure.

*Example 4*

A bath is prepared containing 3 g. plasticiser such as dimethyl phthalate, 0.05 g. of the cation active substance cetyl pyridinium bromide and 97 millilitres of water. A quantity of secondary cellulose acetate flake is precipitated at 45° C. from an acetylation solution made with acetic acid as solvent, and sulphuric acid as catalyst, and washed free from catalyst and acetic acid. The equivalent of 7 g. dry weight of cellulose acetate is immersed, without any previous drying, in the above mentioned plasticiser bath and the temperature raised gradually to 90° C. The treatment is continued until the plasticiser is substantially completely exhausted. The material is then drained and dried. The product is a uniformly plasticised flake which may be used as moulding powder or dissolved in a solvent and spun into yarn and woven into a fabric suitable for laminating, or worked with yarns of cellulose or other non-thermoplastic material to form a fabric or web in which the non-thermoplastic components may be united and bonded by heating the fabric under pressure to a temperature above the tack point of the plasticised thermoplastic component.

*Example 5*

An aqueous emulsion is prepared containing 65% by weight of diethyl phthalate and 1% of the cationic surface active agent used in Example 2, and is diluted so that 500 cc. of liquor contains 3 g. of plasticiser. 7 g. of dry commercial cellulose acetate butyrate in the form of porous flakes are immersed in this liquor which is maintained at 75° C. until exhaustion is complete. The flakes are then removed and dried and ground and is then suitable for use as a moulding powder.

*Example 6*

An emulsion is prepared of 3 grams dioctyl phthalate, 0.1 g. of the cationic agent employed in Example 2 and 400 ml. water. 7 g. of dry powdered ethyl cellulose of 47% ethoxy content (passing 20 B. S. S. sieve) are immersed in this liquor at a temperature of 80° C. for a period of 30 minutes. The material is removed and dried, and may be used as a moulding powder.

In the treatment according to the invention, dyestuffs may be dispersed in the plasticising bath.

From the foregoing description and examples it will be appreciated that the process of the invention provides a ready and convenient means for incorporating plasticisers in pre-determined quantity in solid thermoplastic cellulose derivatives in any form. It also provides a method of particular value for the incorporation of plasticisers in unplasticised or insufficiently plasticised solid thermoplastic cellulose derivatives and enables purchasers of fibres, yarns or fabrics of or containing thermoplastic cellulose derivatives to incorporate a pre-determined proportion or additional proportion of plasticiser therein so as to modify them.

The cationic surface active agents referred to in the above examples are commercially available as proprietary products under trade name. Thus cetyl pyridinium bromide is available as "Fixanol C" and the agent used in Example 2 is available as "Sapamine KW."

I claim:

1. A process for incorporating a plasticiser in a solid water-insoluble thermoplastic cellulose derivative selected from the group consisting of the esters of cellulose of at least one of the following acids, acetic, propionic and butyric acids and water-insoluble methyl and ethyl ethers of cellulose in the form of fibers, flakes and powder which comprises contacting said solid thermoplastic cellulose derivative with a positively charged dispersion essentially composed of an organic plasticiser for said cellulose derivative dispersed in an aqueous medium containing a cationic surface active agent as the dispersing agent for the plasticiser until the required amount of plasticiser is absorbed by said cellulose derivative and said cellulose derivative is uniformly plasticised, said organic plasticiser for the cellulose derivative being an essentially non-volatile plasticiser which when incorporated in the cellulose derivative is essentially permanently retained by said derivative.

2. The process of claim 1 in which said cellulose derivative is one of the cellulose esters defined in claim 1.

3. The process of claim 1 in which said cellulose derivative is one of the cellulose ethers defined in claim 1 which is soluble in an organic solvent.

4. The process of claim 1 in which said cellulose derivative is one of the cellulose esters defined in claim 1 in fibrous form.

5. The process of claim 1 in which said cellulose derivative is one of the cellulose esters defined in claim 1 in the form of a spun yarn.

6. A process for the treatment of a product containing cellulose fibers in admixture with fibers of a thermoplastic cellulose derivative selected from the group consisting of the esters of cellulose of at least one of the following acids, acetic, propionic and butyric acids and water-insoluble methyl and ethyl ethers of cellulose which comprises contacting said solid thermoplastic cellulose derivative with a positively charged dispersion essentially composed of an organic plasticiser for said cellulose derivative dispersed in an aqueous medium containing a cationic surface active agent as the dispersing agent for the plasticiser until the required amount of plasticiser is absorbed by said cellulose derivative and said cellulose derivative is uniformly plasticised, said organic plasticiser for the cellulose derivative being an essentially non-volatile plasticiser which when incorporated in the cellulose derivative is essentially permanently retained by said derivative.

7. The process of claim 1 in which the cellulose derivative contacted with said dispersion is in dry fibrous form.

8. The process of claim 1 in which the cellulose derivative is contacted with said dispersion after its formation in a precipitating bath while still wet from said precipitating bath.

9. The process of claim 1 in which the cellulose derivative contacted with said dispersion is in wet and swollen condition.

10. The process of claim 1 in which the cellulose derivative contacted with said dispersion is in the form of undried precipitated flakes of such size that when dry, substantially all will pass through a sieve having ¼ inch square openings.

11. The process of claim 1 in which the cellulose derivative contacted with said dispersion is in finely powdered form.

12. The process of claim 1 in which the cellulose derivative is contacted with said dispersion at a temperature below 50° C.

13. The process of claim 1 in which the cationic surface active agent is a salt of a quaternary nitrogen base of which the quaternary nitrogen atom carries a higher alkyl group.

14. The process of claim 1 in which the cationic surface active agent is a long chain alkyl pyridinium halide.

15. The process of claim 1 in which the cationic surface active agent is a salt of a compound of the formula $R.CONHC_2H_4N(Y)_2$ wherein $R.CO$ is the acyl radical of a higher fatty acid and Y is a lower alkyl radical.

16. The process of claim 1 in which the cationic surface active agent is a salt of a compound of the formula $R.CONHC_2H_4(C_2H_5)_2$ wherein $R.CO$ is the acyl radical of a higher fatty acid.

References Cited in the file of this patent

UNITED STATES PATENTS

| | | |
|---|---|---|
| Re. 20,997 | De Stubner | Feb. 7, 1939 |
| Re. 22,812 | Jenkins | Dec. 3, 1946 |
| 1,991,115 | Northrup et al. | Feb. 12, 1935 |
| 1,999,405 | Dreyfus | Apr. 30, 1935 |
| 2,105,155 | Moore | Jan. 11, 1938 |
| 2,176,053 | Billing | Oct. 17, 1939 |
| 2,308,732 | White | Jan. 19, 1943 |
| 2,326,128 | Dreyfus et al. | Aug. 10, 1943 |
| 2,326,190 | Whitehead | Aug. 10, 1943 |
| 2,332,817 | Smith | Oct. 26, 1943 |
| 2,333,887 | Redlinger | Nov. 2, 1943 |
| 2,343,095 | Smith | Feb. 29, 1944 |
| 2,345,879 | Moore | Apr. 4, 1944 |
| 2,360,246 | Nally | Oct. 10, 1944 |
| 2,409,703 | Lyem | Oct. 22, 1946 |
| 2,448,571 | Balch et al. | Sept. 7, 1948 |

FOREIGN PATENTS

| | | |
|---|---|---|
| 424,672 | Great Britain | Feb. 26, 1935 |
| 309,964 | Great Britain | Apr. 11, 1929 |
| 413,262 | Great Britain | Oct. 7, 1932 |
| 421,115 | Great Britain | Dec. 13, 1934 |

OTHER REFERENCES

Gregory: "Uses and Applications of Chemical and Related Materials," 1939, pp. 614–615. (Copy in Div. 64.)